US005861788A

United States Patent [19]

Ohkura et al.

[11] Patent Number: 5,861,788

[45] Date of Patent: Jan. 19, 1999

[54] SUPERCONDUCTING COIL

[75] Inventors: Kengo Ohkura; Munetsugu Ueyama; Kenichi Sato, all of Osaka, Japan

[73] Assignee: Sumitomo Electric Industries, Ltd., Osaka, Japan

[21] Appl. No.: 848,464

[22] Filed: May 8, 1997

[30] Foreign Application Priority Data

May 13, 1996 [JP] Japan .................................... 8-117912
Apr. 25, 1997 [JP] Japan .................................... 9-108958

[51] Int. Cl.[6] .............................. H02G 15/00; H01F 6/06

[52] U.S. Cl. .......................... 335/216; 505/230; 505/231; 505/704; 505/705; 505/706; 505/879; 505/884; 505/887

[58] Field of Search ........................... 335/216; 174/15.4, 174/15.5, 125.1; 505/230, 231, 704, 705, 706, 879, 884, 885, 886, 887

[56] References Cited

FOREIGN PATENT DOCUMENTS 0 501 394 9/1992 European Pat. Off. .
0 556 837 8/1993 European Pat. Off. .
1562867 4/1969 France .
56-048 109 5/1981 Japan .
63-095 607 4/1988 Japan .
6-174349 6/1994 Japan .
1104693 2/1968 United Kingdom .

*Primary Examiner*—Renee S. Luebke
*Assistant Examiner*—Raymond Barrera
*Attorney, Agent, or Firm*—Foley & Lardner

[57] ABSTRACT

In application to a superconducting magnet which is cooled by a cryogenic refrigerator, provided is a superconducting coil which can maintain a cooled state and enables a stable operation and continuous driving even if a ramping speed is increased. First and second superconducting conductors are connected with each other. Respective tape-like superconducting multifilamentary wires are electrically connected with each other through solder, to form joint bodies. The respective joint bodies are insulated from each other by interposition of an insulating material therebetween.

11 Claims, 5 Drawing Sheets

SUPERCONDUCTING COIL

BACKGROUND OF THE INVENTION

1. Field of the Invention

The present invention relates to a superconducting coil, and more particularly, it relates to a superconducting coil for a superconducting magnet which is applied to a magnetic resonance diagnostic apparatus or the like and cooled by a cryogenic refrigerator, for example.

2. Description of the Background Art

In general, superconducting magnets are cooled by two types of methods including a method of dipping and cooling a superconducting magnet in a refrigerant such as liquid helium or liquid nitrogen, and a method of thermally connecting a superconducting magnet directly to a cold head of a cryogenic refrigerator.

In the latter superconducting magnet cooled by a cryogenic refrigerator, a superconducting conductor is generally wound on a coil former (bobbin) in the form of a pancake or solenoid. Japanese Patent Laying-Open No. 6-174349 (1994) proposes means of interposing a mixture of silicon grease and a powder material having excellent thermal conductivity in a connecting portion between the cryogenic refrigerator and the superconducting magnet while filling up clearances between coil wires and those between the coil and the bobbin with the mixture, in order to improve the cooling efficiency for the superconducting magnet having such a structure.

While the superconducting coil can be cooled to a prescribed very low temperature in a short time in the superconducting magnet proposed in the aforementioned gazette, however, remarkable heat generation is caused by an ac magnetic field or a shunt current to disadvantageously result in normal conducting transition of the superconducting coil when the superconducting coil is rapidly excited in the state cooled to the prescribed very low temperature. Such heat generation cannot be suppressed, and hence the superconducting magnet cannot be continuously driven and no stable operation can be attained.

SUMMARY OF THE INVENTION

In order to solve the aforementioned problem, an object of the present invention is to provide a structure of a superconducting coil employed for a superconducting magnet, which can maintain a state cooled by a cryogenic refrigerator while suppressing heat generation even if a ramping speed for the superconducting coil is increased.

The superconducting coil according to the present invention comprises a first coil formed by winding a first superconducting conductor, and a second coil wire formed by winding a second superconducting conductor. The first and second coil wires are connected with each other. Each of the first and second superconducting conductors which are connected with each other is formed by first and second superconducting wires. Each of the first and second superconducting wires includes a filament assembly storing superconducting filaments. The superconducting coil comprises first and second joint bodies. In the first joint body, the first superconducting wire forming the first superconducting conductor is joined with the first superconducting wire forming the second superconducting conductor. In the second joint body, the second superconducting wire forming the first superconducting conductor is joined with the second superconducting wire forming the second superconducting conductor. The first and second joint bodies are insulated from each other.

Preferably, the superconducting coil having the aforementioned structure is employed for a superconducting magnet which is cooled by a cryogenic refrigerator.

Preferably, grease containing a ceramic additive in a silicon oil solvent is filled up in a clearance between the first and second coil wires and the interiors of the first and second coil wires. Further preferably, the ceramic additive is prepared from at least one of $SiO_2$, $Al_2O_3$, AlN and ZnO.

Preferably, the first and second coil wires are in the form of pancake coils.

Preferably, each of the first and second superconducting conductors is formed by stacking first and second superconducting wires having tape-like shapes with each other.

The superconducting filaments preferably consist of an oxide superconductor. The oxide superconductor is preferably prepared from a bismuth superconductor. Further, the bismuth superconductor preferably contains either a 2223 phase or a 2212 phase.

In the superconducting coil having the aforementioned structure, the first superconducting conductor may include a first superconducting wire which is relatively outwardly arranged in the first coil wire and a second superconducting wire which is relatively inwardly arranged in the first coil wire, while the second superconducting conductor may include a first superconducting wire which is relatively outwardly arranged in the second coil wire and a second superconducting wire which is relatively inwardly arranged in the second coil wire. In this case, the first superconducting wire relatively outwardly arranged in the first coil wire is joined with the first superconducting wire relatively outwardly arranged in the second coil wire, and the second superconducting wire relatively inwardly arranged in the first coil wire is joined with the second superconductor relatively inwardly arranged in the second coil wire.

Alternatively, the first superconducting conductor may include a first superconducting wire which is relatively outwardly arranged in the first coil wire and a second superconducting wire which is relatively inwardly arranged in the first coil wire, while the second superconducting conductor may include a first superconducting wire which is relatively inwardly arranged in the second coil wire and a second superconducting wire which is relatively outwardly arranged in the second coil wire in the superconducting coil having the aforementioned structure. In this case, the first superconducting wire relatively outwardly arranged in the first coil wire is joined with the first superconducting wire relatively inwardly arranged in the second coil wire, and the second superconducting wire relatively inwardly arranged in the first coil wire is joined with the second superconducting wire relatively outwardly arranged in the second coil wire.

According to the present invention, temperature rise of the superconducting coil can be suppressed to enable a stable operation even if the coil is excited at a high speed, whereby a superconducting magnet can be continuously driven with employment of the structure of the inventive superconducting coil.

When the superconducting coil according to the present invention is applied to a superconducting magnet which is cooled by a cryogenic refrigerator, a more preferable effect can be attained. Further, cooling efficiency to a prescribed very low temperature can be improved by filling up a clearance between the coil wires and the interiors thereof with grease containing a ceramic additive in a silicon oil solvent.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
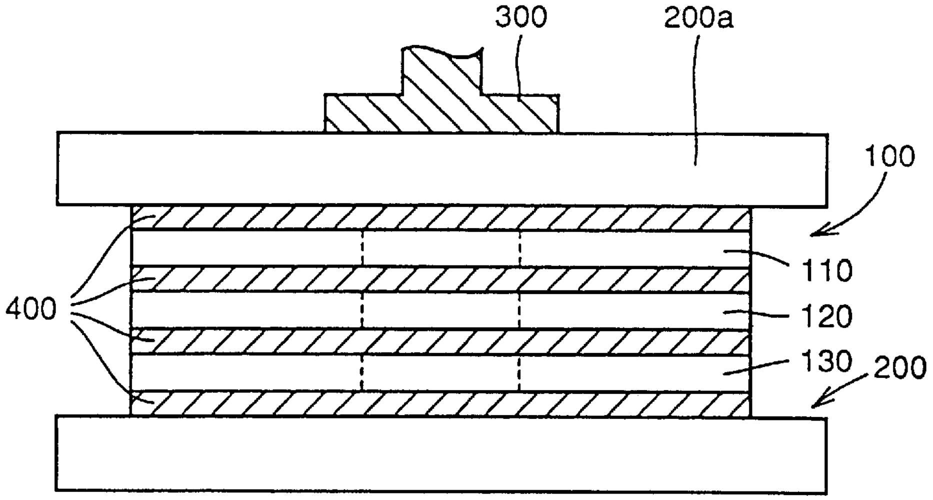
FIG. 1 schematically illustrates the structure of a superconducting magnet to which a superconducting coil according to an embodiment of the present invention is applied.

FIG. 1 schematically illustrates the structure of a superconducting magnet employing a superconducting coil according to an embodiment of the present invention. As shown in FIG. 1, a superconducting coil 100 is mounted on a bobbin 200. The superconducting coil 100 is formed by a plurality of double pancake coils such as three double pancake superconducting coils 110, 120 and 130, for example. Clearances between the superconducting coils 110, 120 and 130, those between the superconducting coils 110 and 130 and the bobbin 200, and the interiors of the superconducting coils 110, 120 and 130 are coated or impregnated with grease 400 of a silicon oil solvent containing ceramic grains of ZnO or the like having excellent thermal conductivity. A cold head 300 of a cryogenic refrigerator is thermally connected directly to a flange 200*a* of the bobbin 200. Superconducting conductors are wound on the bobbin 200 to form the superconducting coils 110, 120 and 130, which are connected with each other.

Figure 2:
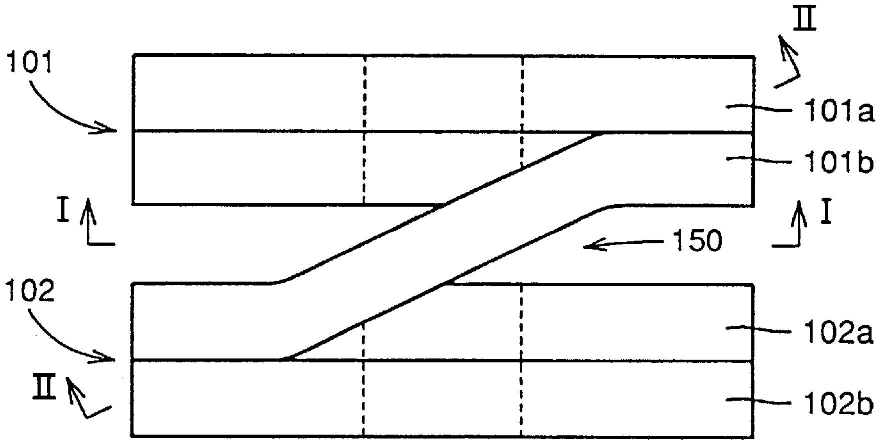
FIG. 2 is a side elevational view typically showing a connection structure between superconducting coils according to embodiment of the present invention.

FIG. 2 is a side elevational view schematically showing the connection structure between two double pancake superconducting coils 101 and 102. As shown in FIG. 2, the double pancake superconducting coil 101 is formed by first and second coil parts 101*a* and 101*b* consisting of oppositely wound superconducting conductors. The double pancake superconducting coil 102 is also formed by first and second coil parts 102*a* and 102*b* consisting of oppositely wound superconducting conductors. The double pancake superconducting coils 101 and 102 are connected with each other on a connecting part 150.

Figure 3:
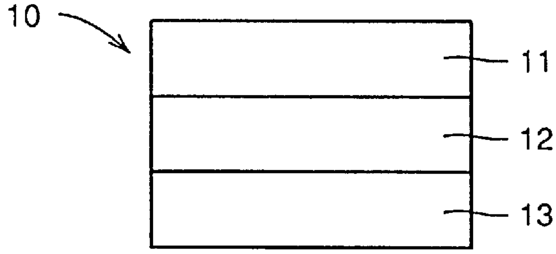
FIG. 3 is a sectional view showing the structure of a superconducting conductor employed as a wire of each superconducting coil according to the embodiment of the present invention.

FIG. 3 is a sectional view showing a superconducting conductor 10 forming each of the superconducting coils 101 and 102. As shown in FIG. 3, the superconducting conductor 10 is formed by a plurality of tape-like superconducting multifilamentary wires such as three tape-like superconducting multifilamentary wires 11, 12 and 13, for example. The tape-like superconducting multifilamentary wires 11, 12 and 13 are stacked with each other to form the superconducting conductor 10, and relatively outwardly positioned in this order in each of the superconducting coils 101 and 102.

Figure 4:
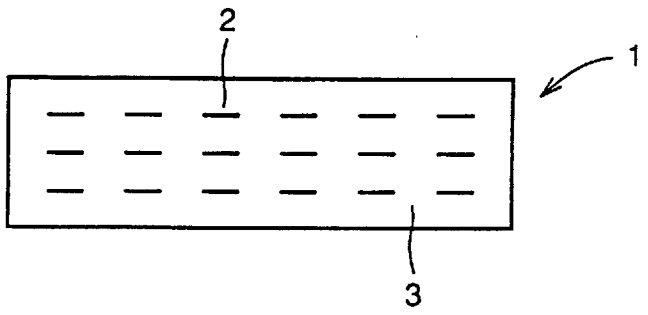
FIG. 4 is a sectional view showing the structure of a single tape-like superconducting multifilamentary wire employed for the superconducting coil according to the embodiment of the present invention.

FIG. 4 shows a section of a single tape-like superconducting multifilamentary wire 1. As shown in FIG. 4, a number of superconducting filaments 2 consisting of an oxide superconductor are embedded in a stabilizer 3 consisting of silver or the like in the tape-like superconducting multifilamentary wire 1.

Figure 5:
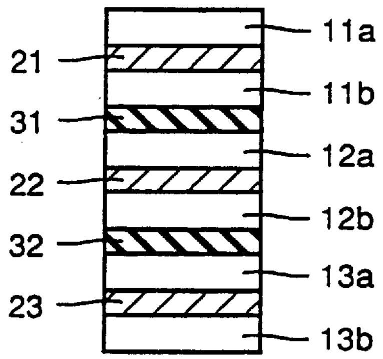
FIG. 5 is a sectional view taken along the line I—I in FIG. 2 showing the connection structure between the superconducting coils according to the embodiment of the present invention in detail.
Figure 6:
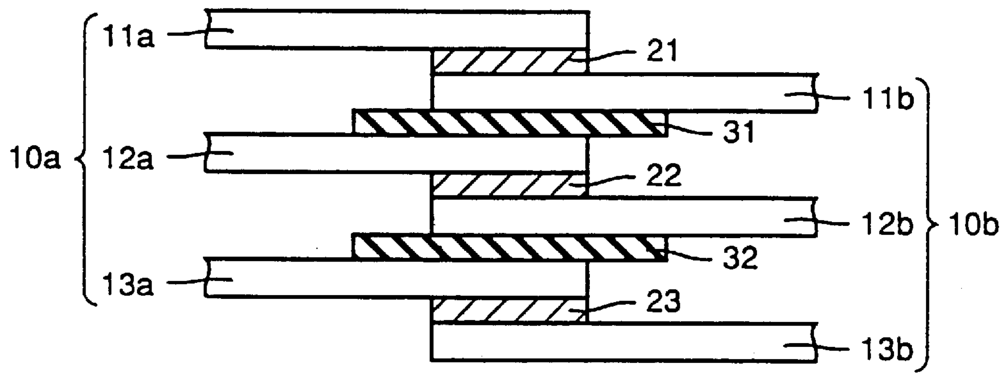
FIG. 6 is a sectional view taken along the line II—II in FIG. 2 showing the connection structure between the superconducting coils according to the embodiment of the present invention.

FIGS. 5 and 6 are sectional views of the connecting part 150 taken along the lines I—I and II—II in FIG. 2 respectively. With reference to these figures, description is now made on the connection structure between the superconducting coils according to the embodiment of the present invention.

A superconducting conductor 10*b* extends from the second coil part 101*b* of the superconducting coil 101 shown in FIG. 2 toward the first coil part 102*a* of the superconducting coil 102. On the other hand, a superconducting conductor 10*a* extends from the first coil part 102*a* of the superconducting coil 102 shown in FIG. 2 toward the second coil part 101*b* of the superconducting coil 101. The superconducting conductor 10*a* is formed by three tape-like superconducting multifilamentary wires 11*a*, 12*a* and 13*a* which are stacked with each other. The superconducting conductor 10*b* is also formed by three tape-like superconducting multifilamentary wires 11*b*, 12*b* and 13*b* which are stacked with each other.

In the connecting part 150, the tape-like superconducting multifilamentary wire 11*a* is electrically connected with the tape-like superconducting multifilamentary wire 11*b* by a solder layer (Pb—Sn alloy) 21. Thus formed is a single joint body. Further, the tape-like superconducting multifilamentary wire 12*a* is electrically connected with the tape-like superconducting multifilamentary wire 12*b* by a solder layer 22. Thus formed is another joint body. In addition, the tape-like superconducting multifilamentary wire 13*a* is electrically connected with the tape-like superconducting multifilamentary wire 13*b* by a solder layer 23. Thus formed is still another joint body.

Insulating materials 31 and 32 of polyimide or the like are interposed between the joint bodies.

Due to employment of the aforementioned connection structure between the superconducting coils, heat generation caused by an ac magnetic field or a shunt current can be suppressed for preventing normal conducting transition of the superconducting coils even if the superconducting coils are rapidly excited. Thus, temperature rise of the superconducting coils can be suppressed to enable a stable operation even if the ramping speed therefor is increased. Consequently, a superconducting magnet employing the inventive superconducting coils can be continuously driven.

In the embodiment of the present invention, the clearances between the superconducting coils 110, 120 and 130, those between the superconducting coils 110 and 130 and the bobbin 200, and the interiors of the superconducting coils 110, 120 and 130 are filled up with the grease 400 of a silicon oil solvent containing ceramic powder having excellent thermal conductivity, as shown in FIG. 1. Thus, the superconducting coils 110, 120 and 130 can be effectively cooled by filling up the clearances requiring thermal conduction with the grease 400. Namely, the superconducting coils 110, 120 and 130 can be rapidly cooled to a prescribed very low temperature in case of cooling the superconducting magnet by thermally connecting the same directly to the cold head 300 of the cryogenic refrigerator. Thus, the superconducting magnet can be efficiently initially cooled to the prescribed very low temperature by employing the aforementioned inventive connection structure between the superconducting coils 110, 120 and 130 and filling up the clearances and the interiors with the prescribed grease 400, while the superconducting magnet can be continuously driven in a state maintained at a prescribed low temperature after cooling.

Figure 8:
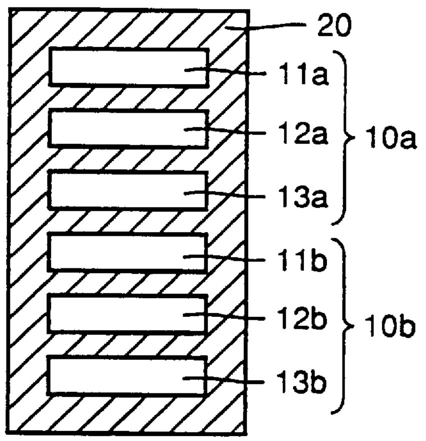
FIG. 8 PRIOR ART
FIG. 8 is a sectional view taken along the line I—I in FIG. 2, showing a conventional connection structure between superconducting coils.
Figure 9:
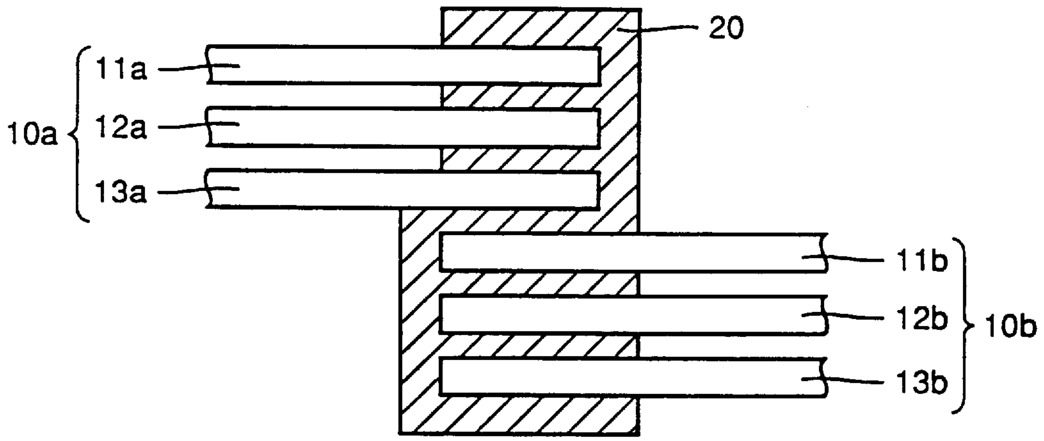
FIG. 9 PRIOR ART
FIG. 9 is a sectional view taken along the line II—II in FIG. 2, showing the conventional connection structure between superconducting coils.

In a conventional superconducting coil, the following connection structure has been applied: FIGS. 8 and 9 are sectional views of the connecting part 150 shown in FIG. 2 taken along the lines I—I and II—II respectively. The conventional connection structure is described with reference to these figures. A superconducting conductor 10*a* is formed by three tape-like superconducting multifilamentary wires 11*a*, 12*a* and 13*a*. Another superconducting conductor 10*b* is also formed by three tape-like superconducting multifilamentary wires 11*b*, 12*b* and 13*b*. In the conventional connection structure, the tape-like superconducting multifilamentary wires 11*a*, 12*a* and 13*a* and 11*b*, 12*b* and 13*b* are not separated from each other but stacked and collectively connected with each other to form the superconducting conductors 10*a* and 10*b* respectively. The superconducting conductor 10*a* formed by the three tape-like superconducting multifilamentary wires 11*a*, 12*a* and 13*a* is electrically connected with the superconducting conductor 10*b* formed by the three tape-like superconducting multifilamentary wires 11*b*, 12*b* and 13*b* in the stacked state through a solder layer 20 entirely covering the same.

The inventor considers that the connection resistance between the superconducting conductors 10*a* and 10*b* disperses depending on the method of forming the solder layer 20 in the aforementioned conventional connection structure. The inventor also considers that an excessive current flows to parts of the tape-like superconducting multifilamentary wires 11*a*, 12*a*, 13*a*, 11*b*, 12*b* and 13*b* to generate a voltage and heat. The inventor further considers that normal conducting transition consequently results in the superconducting coil.

The present invention has been made on the aforementioned recognition of the inventor. The connection structure according to the present invention has been attained as a result of various studies on connection structures between superconducting coils, to enable suppression of heat generation in the superconducting coil due to the aforementioned structure.

Figure 10:
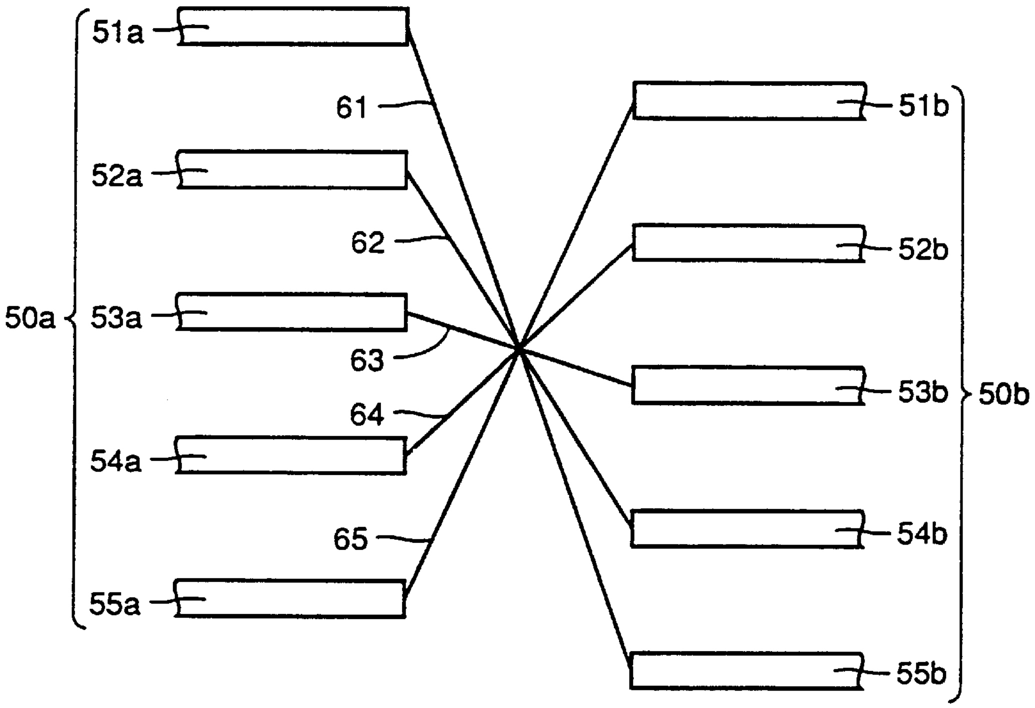
FIG. 10 conceptually illustrates a mode of connection between superconducting coils according to another embodiment of the present invention.

FIG. 10 conceptually illustrates a mode of connection between superconducting coils according to another embodiment of the present invention. As shown in FIG. 10, superconducting conductors 50*a* and 50*b* extend from first and second superconducting coils respectively. The superconducting conductor 50*a* is formed by five stacked tape-like superconducting multifilamentary wires 51*a*, 52*a*, 53*a*, 54*a* and 55*a*, which are relatively outwardly positioned in this order in the first superconducting coil. The superconducting conductor 50*b* is also formed by five stacked tape-like superconducting multifilamentary wires 51*b*, 52*b*, 53*b*, 54*b* and 55*b*, which are relatively outwardly positioned in this order in the second superconducting coil.

The tape-like superconducting multifilamentary wire 51*a* is electrically connected with the tape-like superconducting multifilamentary wire 55*b*, as shown at 61. The tape-like superconducting multifilamentary wire 52*a* is electrically connected with the tape-like superconducting multifilamentary wire 54*b*, as shown at 62. The tape-like superconducting multifilamentary wire 53*a* is electrically connected with the tape-like superconducting multifilamentary wire 53*b*, as shown at 63. The tape-like superconducting multifilamentary wire 54*a* is electrically connected with the tape-like superconducting multifilamentary wire 52*b*, as shown at 64. The tape-like superconducting multifilamentary wire 55*a* is electrically connected with the tape-like superconducting multifilamentary wire 51*b*, as shown at 65.

In the aforementioned manner, the superconducting multifilamentary wires forming the superconducting conductor 50*a* and being relatively outwardly positioned in the coil are successively electrically connected with the superconducting multifilamentary wires forming the superconducting conductor 50*b* and being relatively inwardly positioned in the coil. Thus, the superconducting multifilamentary wires can be uniformalized in inductance in the superconducting coils. Consequently, heat generation of the superconducting coils can be further effectively suppressed so that loss can be reduced in excitation with an alternating current.

While each of the above embodiments has been described with reference to double pancake superconducting coils, the aforementioned effect can also be attained in superconducting coils consisting of superconducting conductors which are wound in the form of solenoids.

While the superconducting conductors have tape-like shapes in each of the aforementioned embodiments, the present invention is also applicable to superconducting conductors having shapes other than the tape-like ones.

While the superconducting filaments are made of an oxide superconductor such as a bismuth oxide superconductor, for example, in each of the aforementioned embodiments, the present invention is applicable not only to superconducting filaments of an oxide superconductor but those made of a metal superconductor or the like.

Concrete Example of the present invention is now described.

First, the tape-like superconducting multifilamentary wire 1 shown in FIG. 4 was prepared as follows:

Oxides or carbonates of respective elements were mixed with each other so that Bi, Pb, Sr, Ca and Cu were in the ratios of 1.80:0.41:2.01:2.18:3.02, for preparing powder mainly consisting of a 2212 phase and a non-superconducting phase by heat treatment. This powder was degassed in the atmosphere at 800° C. for two hours. The degassed powder was charged in a silver pipe of 12 mm in outer diameter and 10 mm in inner diameter, which in turn was drawn to a diameter of 1.93 mm. 61 such drawn pipes were charged in a silver pipe of 21.23 mm in outer diameter and 17.37 mm in inner diameter, which in turn was further drawn to an outer diameter of 1.4 mm. This wire was rolled to a thickness of 0.24 mm.

The superconducting multifilamentary wire 1 prepared in the aforementioned manner exhibited a section shown in FIG. 4. In this tape-like superconducting multifilamentary wire 1, 61 superconducting filaments 2 consisting of a bismuth oxide superconductor (mainly of a 2223 phase) are embedded in a stabilizer 3 consisting of silver, as shown in FIG. 4. The tape-like superconducting multifilamentary wire 1 had a thickness of 0.24 mm and a width of 3.6 mm.

Three such tape-like superconducting multifilamentary wires 11, 12 and 13 were prepared and stacked with each other for forming a superconducting conductor 10, as shown in FIG. 3.

This superconducting conductor 10 was further wound on a bobbin 200, for forming double pancake superconducting coils. While FIG. 1 shows three double pancake superconducting coils 110, 120 and 130, 19 double pancake superconducting coils were stacked and formed around a bobbin in this Example. The total height of the 19 double pancake superconducting coils was 150 mm, while the outer and inner diameters were 180 mm and 60 mm respectively. The total number of turns of the 19 stacked double pancake superconducting coils was 2600.

The 19 double pancake superconducting coils were connected with each other in the structure shown in FIGS. 2, 5 and 6. The thickness of each of the solder layers (Pb—Sn alloy) 21, 22 and 23 was 10 to 100 $\mu$m. The insulating materials 31 and 32 were prepared from polyimide. The thickness of each of the insulating materials 31 and 32 was about 15 $\mu$m.

Further, grease of a silicon oil solvent containing ZnO powder as ceramic powder having excellent thermal conductivity was applied to clearances between the superconducting coils, those between the superconducting coils positioned on upper and lower end portions of a superconducting magnet and the bobbin, and the interiors of the superconducting coils as shown in FIG. 1, in order to improve thermal conductivity between the pancake superconducting coils.

A superconducting magnet was formed by the superconducting coils prepared in the aforementioned manner. Further, a cold head of a cryogenic refrigerator was thermally connected directly to the superconducting magnet. Namely, a cold head 300 was thermally connected directly to a flange **200*a* of the bobbin 200, as shown in FIG. 1**.

The superconducting magnet was driven under conditions of a coil current of 100 A and a central magnetic field of 2 T. The employed cryogenic refrigerator had cooling ability capable of maintaining a low temperature of 20 K with respect to a heat generation capacitance of 4 W. In the superconducting magnet driven under such conditions, it was possible to cool the superconducting coils to a temperature of 20 K in about 20 hours.

Figure 7:
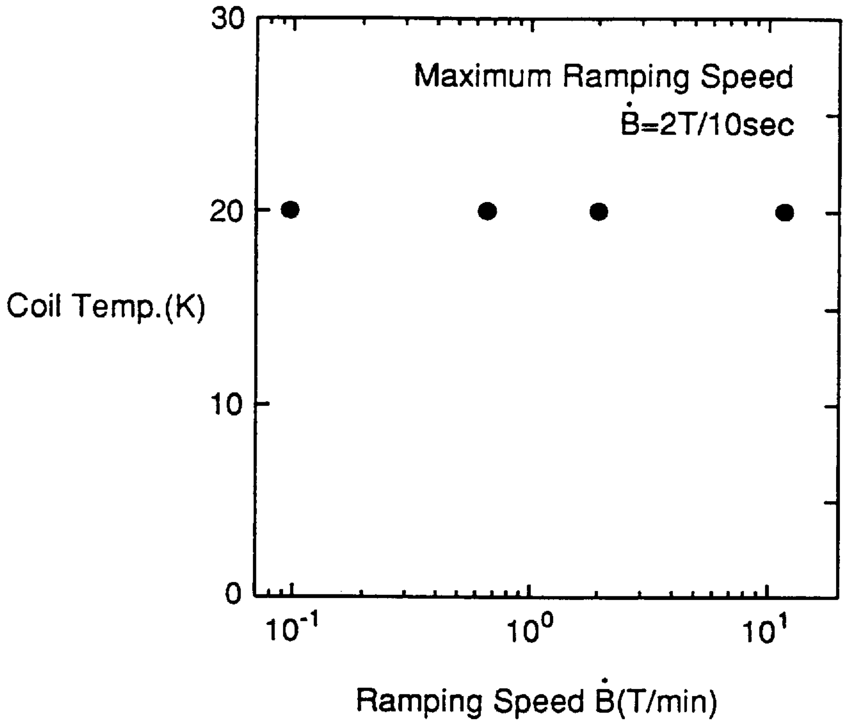
FIG. 7 is a graph showing the relation between ramping speeds for a superconducting coil according to Example of the present invention and the coil temperature.

Each superconducting coil was excited at various ramping speeds up to a coil current of 100 A and a central magnetic field of 2 T. FIG. 7 shows the relation between the temperature (K) at the center of the superconducting coil and the respective ramping speeds (T/min.). The maximum ramping speed was 2 (T/10 sec.). It is understood from FIG. 7 that the temperature of the superconducting coil was substantially unchanged and maintained at 20 K despite increase of the ramping speeds.

When the conventional connection structure between the superconducting coils shown in FIGS. 8 and 9 was employed, temperature rise $\Delta T$ of each superconducting coil prepared similarly to the aforementioned Example was about 10 K when the ramping speed was 1 (T/min.) to instable an operation of a superconducting magnet formed by the superconducting coil.

As hereinabove described, it is understood possible to suppress temperature rise of the superconducting coil, attain a stable operation, and continuously drive the superconducting magnet by employing the inventive connection structure for the superconducting coil. It is also understood that cooling efficiency to a prescribed very low temperature can be improved by filling up the clearances between the superconducting coils etc. with prescribed grease.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A superconducting coil comprising a first coil wire being formed by winding a first superconducting conductor and a second coil wire being formed by winding a second superconducting conductor, said first and second coil wires being connected with each other, wherein each of said first and second superconducting conductors being connected with each other includes first and second superconducting wires, and each of said first and second superconducting wires includes a filament assembly storing superconducting filaments, said superconducting coil further comprising:

a first joint body being formed by joining said first superconducting wire forming said first superconducting conductor with said first superconducting wire forming said second superconducting conductor; and a second joint body being formed by joining said second superconducting wire forming said first superconducting conductor with said second superconducting wire forming said second superconducting conductor, said first and second joint bodies being insulated from each other.

2. The superconducting coil in accordance with claim 1, wherein said first and second coil wires are wires being in the form of pancake coils.

3. The superconducting coil in accordance with claim 1, wherein each of said first and second superconducting conductors is formed by stacking said first and second superconducting wires having tape-like shapes.

4. The superconducting coil in accordance with claim 1, wherein said first superconducting conductor includes a first superconducting wire being relatively outwardly arranged in said first coil wire, and a second superconducting wire being relatively inwardly arranged in said first coil wire, and said second superconducting conductor includes a first superconducting wire being relatively outwardly arranged in said second coil wire, and a second superconducting wire being relatively inwardly arranged in said second coil wire.

5. The superconducting coil in accordance with claim 1, wherein said first superconducting conductor includes a first superconducting wire being relatively outwardly arranged in said first coil wire, and a second superconducting wire being relatively inwardly arranged in said first coil wire, and said second superconducting conductor includes a first superconducting wire being relatively inwardly arranged in said second coil wire, and a second superconducting wire being relatively outwardly arranged in said second coil wire.

6. The superconducting coil in accordance with claim 1, being applied to a superconducting magnet cooled by a cryogenic refrigerator.

7. The superconducting coil in accordance with claim 6, wherein grease containing a ceramic additive in a silicon oil solvent is filled up in a clearance between said first and second coil wires and the interiors of said first and second coil wires.

8. The superconducting coil in accordance with claim 7, wherein said ceramic additive is at least one material selected from a group consisting of $SiO_2$, $Al_2O_3$, AlN and ZnO.

9. The superconducting coil in accordance with claim 1, wherein said superconducting filaments consist of an oxide superconductor.

10. The superconducting coil in accordance with claim 9, wherein said oxide superconductor is a bismuth superconductor.

11. The superconducting coil in accordance with claim 10, wherein said bismuth superconductor contains either a 2223 phase or a 2212 phase.

* * * * *